C. E. MARTIN.
CORRUGATED CULVERT PIPE.
APPLICATION FILED MAY 15, 1912.
1,083,548.
Patented Jan. 6, 1914.
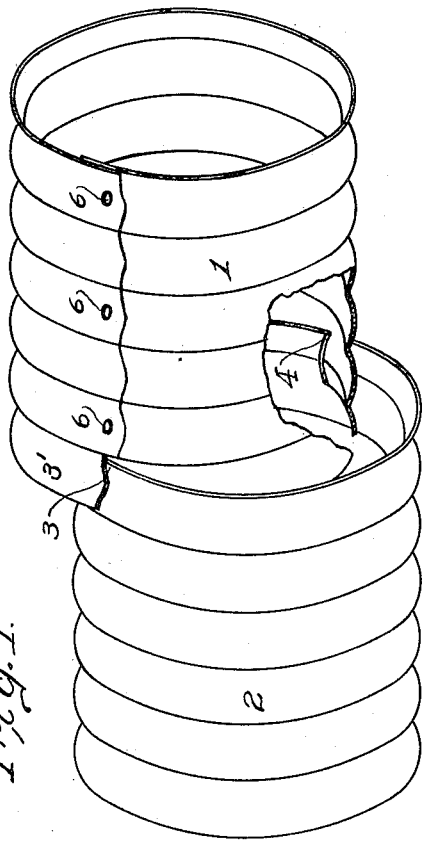
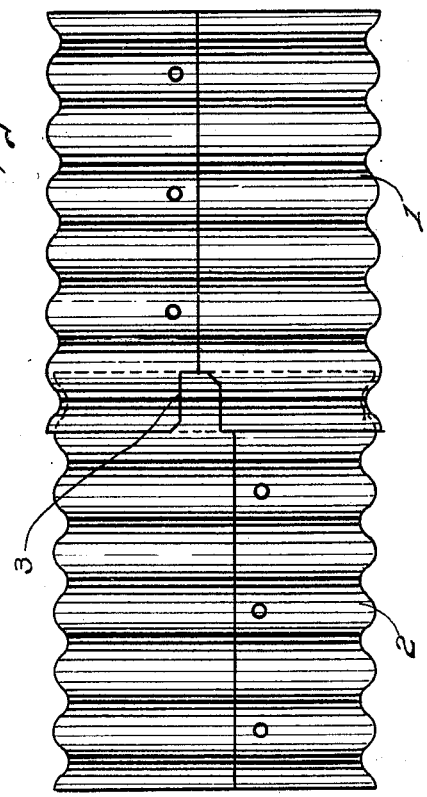
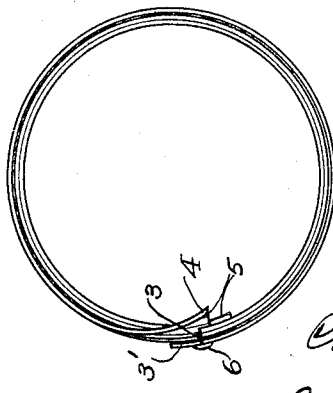

UNITED STATES PATENT OFFICE.

CHARLES E. MARTIN, OF MANSFIELD, OHIO.

CORRUGATED CULVERT-PIPE.

1,083,548.   Specification of Letters Patent.   Patented Jan. 6, 1914.

Application filed May 15, 1912. Serial No. 697,468.

*To all whom it may concern:*

Be it known that I, CHARLES E. MARTIN, a citizen of the United States of America, residing at Mansfield, in the county of Richland and State of Ohio, have invented certain new and useful Improvements in Corrugated Culvert-Pipes, of which the following is a specification.

My invention relates to corrugated culvert pipes.

The object of my invention is to provide means for joining and locking the ends of sections together without the use of bolts or of any other fastening means; to provide a cheap and efficient means to join corrugated sections of pipe together.

In the drawings, Figure 1 is a side view of two sections of pipe with parts broken away to show the method of connecting the sections. Fig. 2 is a side view of two sections showing them connected together for use. Fig. 3 is an end view of one section showing the downturned and notched end.

Referring to the drawings, Fig. 1, reference numerals 1 and 2 designate two sections of a culvert pipe preparatory to being fastened together. The end of one pipe is made slightly smaller in diameter than the end of the other pipe, usually just the difference between the gage or thickness of the material the culvert pipe is made of.

Adjacent to the end of the pipe, a notch 3 is provided in the over-lapping edge 3' of the culvert pipe. The under-lapping edge 4 is also provided with a notch 5 and is pressed downward away from the overlapping edge 3' to leave a space sufficiently large to receive and engage one-half of a corrugation of another section of a similar culvert pipe. The over-lapping edges of the culvert pipe are riveted together by the rivets 6.

It will be understood that the sections that are to be connected together have their ends arranged and constructed in the same manner as hereinbefore described, each end being an exact duplicate of the other except in size. When it is desired to connect the sections together, they are made to engage each other through the medium of downturned edges and notches as shown in Fig. 1, and pressed together until the half corrugation of each end of each section are meshed with each other, thereby joining them together. The sections are then turned until the notches are in the position shown in Fig. 2 when the sections are ready for use. When the sections are about to be joined, the down-turned edges are placed at points diametrically opposed to each other at which point the half corrugations at the end of the pipes readily overlap and aline with each other. When it is desired to remove or separate the sections, one of the notches in a section is turned to a position diametrically opposed to the other at which point they can be readily disengaged.

What I claim is:—

A corrugated culvert comprising interlocking corrugated sections; said sections being constructed of sheet metal leaving at their ends one-half of a corrugation, there being a slit formed in one edge of each section, the latter at one side of the slit being downturned whereby the sections can be engaged or connected together and guided by said downturned parts; said halves of each corrugation being complemental to the corrugated end of another pipe, one half of each corrugation fitting within the other and interlocking therewith, and when connected and rotated preventing its separation from an opposed pipe except by hand manipulation.

In testimony whereof I affix my signature in presence of two witnesses.

CHARLES E. MARTIN.

Witnesses:
 JOHN H. COSS,
 DOROTHY WENDLAND.

---

Copies of this patent may be obtained for five cents each, by addressing the "Commissioner of Patents, Washington, D. C."